United States Patent
Salter et al.

(10) Patent No.: US 11,724,643 B2
(45) Date of Patent: Aug. 15, 2023

(54) VEHICLE ALARM

(71) Applicant: Ford Global Technologies, LLC, Dearborn, MI (US)

(72) Inventors: Stuart C. Salter, White Lake, MI (US); Donald Paul Bilger, Livonia, MI (US); Paul Kenneth Dellock, Northville, MI (US); David Brian Glickman, Southfield, MI (US); Sam Harris, Billericay (GB); Tarik Safir, Chesterfield (GB)

(73) Assignee: Ford Global Technologies, LLC, Dearborn, MI (US)

( * ) Notice: Subject to any disclaimer, the term of this patent is extended or adjusted under 35 U.S.C. 154(b) by 11 days.

(21) Appl. No.: 17/152,840

(22) Filed: Jan. 20, 2021

(65) Prior Publication Data

US 2022/0227290 A1 Jul. 21, 2022

(51) Int. Cl.
*B60Q 1/50* (2006.01)
*B60Q 1/30* (2006.01)
*B60Q 5/00* (2006.01)
*B60R 11/04* (2006.01)

(52) U.S. Cl.
CPC ............ *B60Q 1/525* (2013.01); *B60Q 1/307* (2013.01); *B60Q 5/006* (2013.01); *B60R 11/04* (2013.01); *B60Q 2900/30* (2013.01); *B60R 2300/301* (2013.01); *B60R 2300/406* (2013.01); *B60R 2300/8066* (2013.01); *B60R 2300/8093* (2013.01)

(58) Field of Classification Search
CPC ........ B60Q 1/525; B60Q 1/307; B60Q 5/006; B60Q 2900/30; B60R 11/04; B60R 2300/301; B60R 2300/406; B60R 2300/8066; B60R 2300/8093
See application file for complete search history.

(56) References Cited

U.S. PATENT DOCUMENTS

| | | | |
|---|---|---|---|
| 8,260,518 B2 | 9/2012 | Englert | |
| 8,838,353 B2 | 9/2014 | Wu et al. | |
| 9,446,713 B2 | 9/2016 | Lu et al. | |
| 9,776,631 B1* | 10/2017 | Domeyer | B60W 10/18 |
| 10,026,319 B2* | 7/2018 | Wu | G08B 6/00 |
| 10,183,632 B2 | 1/2019 | Nakanishi et al. | |
| 10,384,605 B1 | 8/2019 | Golgiri et al. | |
| 10,663,581 B2 | 5/2020 | Decker et al. | |
| 2013/0038436 A1* | 2/2013 | Brey | B60T 7/16 |
| | | | 701/1 |

(Continued)

FOREIGN PATENT DOCUMENTS

| | | |
|---|---|---|
| CN | 105513426 A | 4/2016 |
| DE | 102017123226 A1 | 4/2019 |

(Continued)

*Primary Examiner* — Daryl C Pope
(74) *Attorney, Agent, or Firm* — Frank Lollo; Bejin Bieneman PLC

(57) ABSTRACT

A computer includes a processor and a memory storing instructions executable by the processor to detect an object in data received from a rear-facing radar on a vehicle and activate an alarm in response to the object moving through a predesignated region behind the vehicle at a speed below a threshold speed or for a duration above a threshold time.

19 Claims, 8 Drawing Sheets

(56) References Cited

U.S. PATENT DOCUMENTS

| | | | |
|---|---|---|---|
| 2013/0116887 A1* | 5/2013 | Tieman | G08G 1/166 |
| | | | 701/36 |
| 2016/0332569 A1* | 11/2016 | Ishida | B60W 30/09 |
| 2017/0291543 A1* | 10/2017 | Goldman-Shenhar | B60Q 9/00 |
| 2017/0341580 A1* | 11/2017 | Okuda | B60Q 9/008 |
| 2019/0064831 A1* | 2/2019 | Gali | G05D 1/0214 |
| 2019/0111835 A1* | 4/2019 | Remberg Bueno | B60Q 1/48 |
| 2019/0147744 A1* | 5/2019 | Grimm | B60Q 5/005 |
| | | | 701/301 |
| 2020/0070725 A1* | 3/2020 | Ding | G06V 20/58 |
| 2020/0284872 A1 | 9/2020 | Fix | |
| 2020/0346690 A1* | 11/2020 | Maruoka | B60R 99/00 |
| 2021/0170939 A1* | 6/2021 | Whitton | G01S 13/87 |

FOREIGN PATENT DOCUMENTS

| | | | | |
|---|---|---|---|---|
| EP | 2848498 A1 * | 3/2015 | | B60T 8/1708 |
| JP | 2002022828 A * | 1/2002 | | |

* cited by examiner

VEHICLE ALARM

BACKGROUND

Center high-mounted stop lamps (CHMSL) are brake lamps positioned above a rear window of a vehicle and centered laterally on the vehicle. CHMSLs have been required by United States regulations for new cars and light trucks since the 1990s. The purpose of the CHMSL is to be visible to other vehicles.

DETAILED DESCRIPTION

Figure 1:
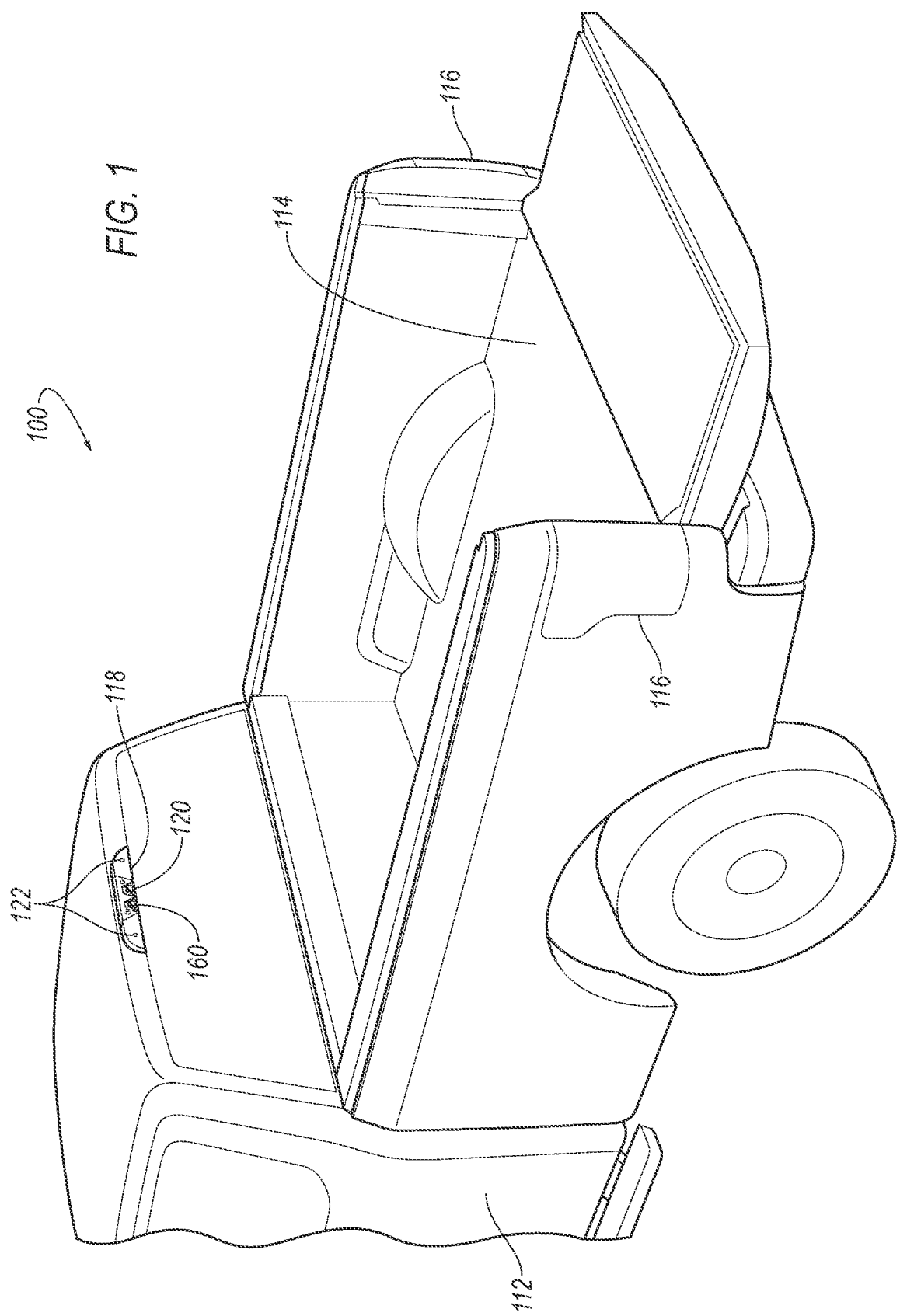
FIG. 1 is a rear perspective view of an example vehicle.

A computer includes a processor and a memory storing instructions executable by the processor to detect an object in data received from a rear-facing radar on a vehicle, and activate an alarm in response to the object moving through a predesignated region behind the vehicle at a speed below a threshold speed or for a duration above a threshold time.

The instructions may include instructions to receive a plurality of inputs from a mobile device, and generate the predesignated region based on the inputs. The inputs may be positions of the mobile device, and the predesignated region may be circumscribed by the positions.

The instructions may include instructions to prevent the alarm from activating in response to the vehicle being in a gear other than park.

The instructions may include instructions to detect a trailer behind the vehicle, and the predesignated region may be a region between the vehicle and the trailer. The vehicle may be a first vehicle, the alarm may be a first alarm, and the instructions may include instructions to activate a second alarm in response to the object being present in the predesignated region while detecting a second vehicle that is rearward from the trailer relative to the first vehicle and that is moving forward relative to the first vehicle. Activating the second alarm may be illuminating a brake lamp of the vehicle.

The instructions may include instructions to prevent the alarm from activating in response to the object being present in the predesignated region while detecting a second vehicle that is rearward from the trailer relative to the first vehicle and that is moving forward relative to the first vehicle.

Detecting the trailer may include receiving a message from the trailer via Bluetooth Low Energy.

Detecting the trailer may include receiving image data from a camera including the trailer and performing image recognition on the trailer.

The instructions may include instructions to determine that the object is a person, recognize the person, and prevent the alarm from activating in response to recognizing the person. Recognizing the person may include receiving image data from a camera including a face of the person and performing image recognition on the face.

Recognizing the person may include receiving a message from a mobile device or key fob of the person.

A system includes a rear-facing radar on a vehicle, an alarm on the vehicle, and a computer communicatively coupled to the radar and the alarm, and the computer is programmed to detect an object in data received from the radar, activate the alarm in response to the object moving through a predesignated region behind the vehicle at a speed below a threshold speed or for a duration above a threshold time.

The system may further include a center high-mounted stop lamp (CHMSL) housing containing the radar, and the radar may be arranged in the CHMSL housing so that a field of view of the radar encompasses a storage area of the vehicle when the CHMSL housing is installed. The system may further include a lamp contained in the CHMSL housing and communicatively coupled to the computer, the vehicle may be a first vehicle, and the computer may be further programmed to detect a trailer behind the vehicle, the predesignated region being a region between the vehicle and the trailer; and activate the lamp in response to the object being present in the predesignated region while detecting a second vehicle that is rearward from the trailer relative to the first vehicle and that is moving forward relative to the first vehicle.

The system may further include a camera contained in the CHMSL housing and communicatively coupled to the computer, the computer may be further programmed to detect a trailer behind the vehicle by using image recognition on data received from the camera, and the predesignated region may be a region between the vehicle and the trailer.

The system may further include a camera contained in the CHMSL housing and communicatively coupled to the computer, and the computer may be further programmed to determine that the object is a person, recognize the person by performing image recognition on a face of the person in data received from the camera, and prevent the alarm from activating in response to recognizing the person.

The system may further include a camera contained in the CHMSL housing and communicatively coupled to the computer, and the computer may be further programmed to turn on the camera in response to the object moving through the predesignated region.

A method includes detecting an object in data received from a rear-facing radar on a vehicle, and activating an alarm in response to the object moving through a predesignated region behind the vehicle at a speed below a threshold speed or for a duration above a threshold time.

With reference to the Figures, a computer 102 includes a processor and a memory storing instructions executable by the processor to detect an object 104 in data received from a rear-facing radar 106 on a first vehicle 100 and activate a first alarm in response to the object 104 moving through a predesignated region 108 behind the first vehicle 100 at a speed below a threshold speed or for a duration above a threshold time.

The radar 106 is positioned to detect an object 104 such as a person that is passing near a storage area 114 of the vehicle 100 such as a bed of the pickup truck. A pickup truck bed is typically open, which exposes the contents of the bed. When the object 104 detected by the radar 106 is a person, the system herein provides a way to determine whether the person is quickly passing by the vehicle 100 or whether the person is loitering, based on the speed with which the person is walking or the duration during which the person lingers near the bed of the vehicle 100. There is a higher risk of theft when the person is loitering than when the person is passing by, and the system can selectively activate the first alarm in the higher-risk situation and not the lower-risk situation. The first alarm can be, e.g., one or more of speakers 110 able to generate a sound, brake lamps 116, 122 able to flash, etc.

With reference to FIG. 1, the first vehicle 100 may be any suitable type of automobile, e.g., a passenger or commercial automobile such as a sedan, a coupe, a truck, a sport utility, a crossover, a van, a minivan, a taxi, a bus, etc.

The first vehicle 100 may include a body 112. The first vehicle 100 may be of a unibody construction, in which a frame and the body 112 of the first vehicle 100 are a single component. The first vehicle 100 may, alternatively, be of a body 112-on-frame construction, in which the frame supports the body 112 that is a separate component from the frame. The frame and body 112 may be formed of any suitable material, for example, steel, aluminum, etc.

The body 112 of the first vehicle 100 includes a storage area 114, i.e., an area to place cargo to be transported by the vehicle. The storage area 114 can be exposed, such as a pickup-truck bed, as shown in FIG. 1. The storage area 114 can alternatively or additionally include a covering, such as a truck bed or a vehicle trunk with a lid.

The first vehicle 100 includes corner lamps 116. The corner lamps 116 can be located at rear right and left corners of the first vehicle 100. The corner lamps 116 may be any lighting system suitable for easy visibility by other vehicles operating near the first vehicle 100, e.g., tungsten, halogen, high-intensity discharge (HID) such as xenon, light-emitting diode (LED), laser, etc. The corner lamps 116 can include casings that are transparent and, e.g., partially colored red to indicate braking, i.e., the corner lamps 116 are brake lamps. Another portion of the casings may be noncolored to indicate shifting into reverse, and another portion may be amber to indicate a turn signal.

Figure 2:
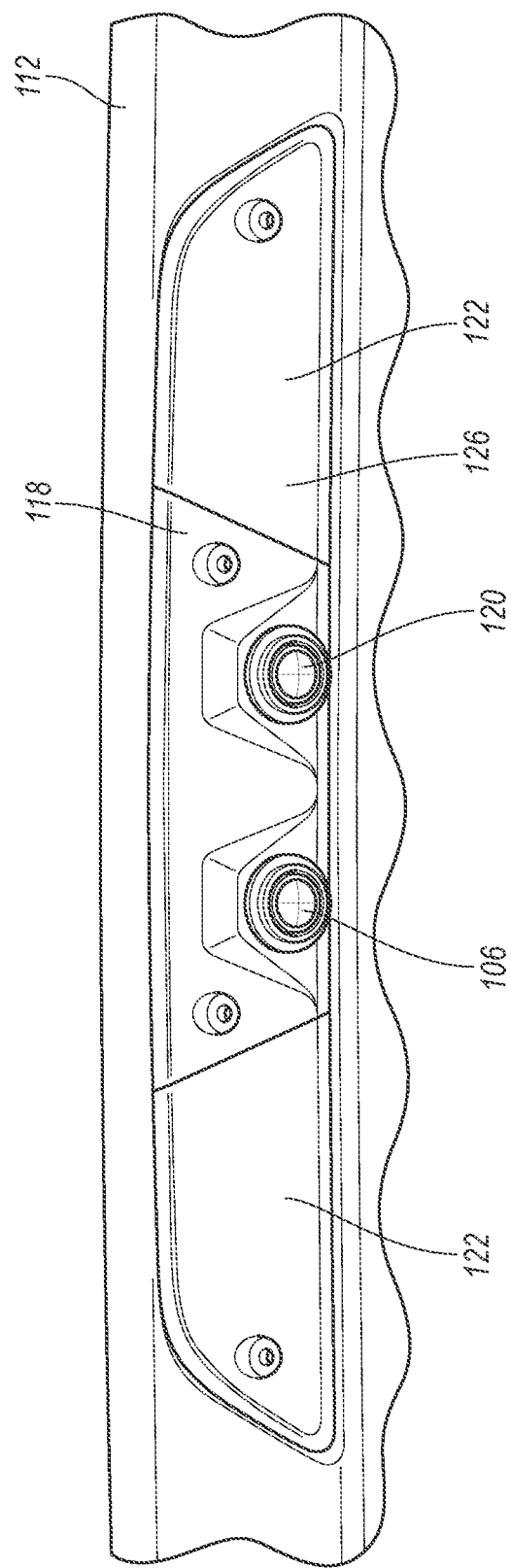
FIG. 2 is a plan view of a center high-mounted stop lamp (CHMSL) unit of the vehicle.
Figure 3:
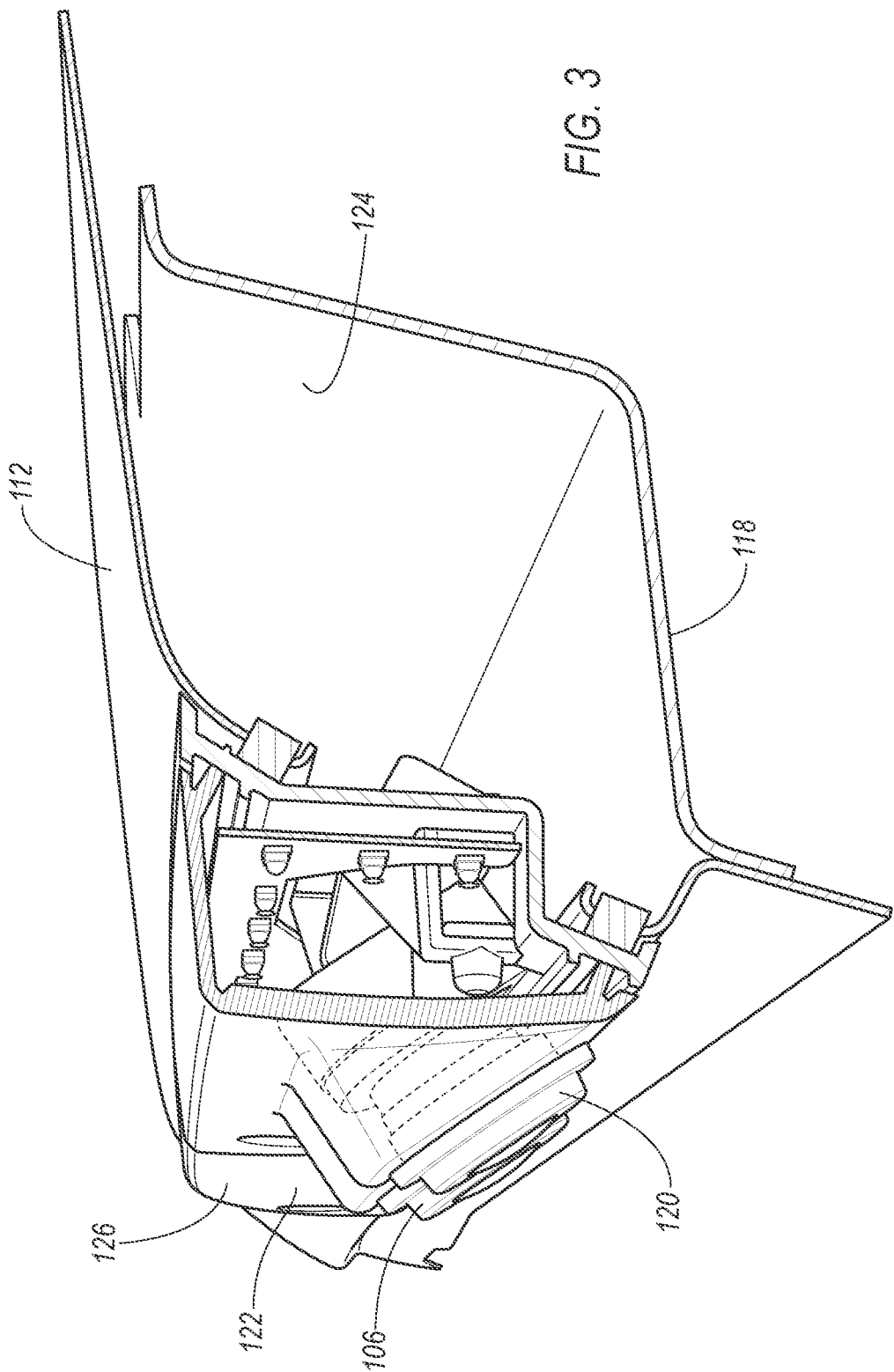
FIG. 3 is a perspective cutaway view of the CHMSL unit.

With reference to FIGS. 2 and 3, the first vehicle 100 includes a center high-mounted stop lamp (CHMSL) housing 118. The CHMSL housing 118 contains the radar 106, a camera 120, and at least one CHMSL lamp 122. The CHMSL housing 118 can include an internal panel 124 and a lamp panel 126. The internal panel 124 can be concealed inside the body 112 of the first vehicle 100. The lamp panel 126 can be exposed on the body 112 of the first vehicle 100. Some or all of the lamp panel 126 is transparent, and some or all of the transparent portion of the lamp panel 126 is colored, e.g., red to indicate braking. The lamp panel 126 covers the CHMSL lamps 122, which can be illuminated to indicate the vehicle is braking, i.e., the CHMSL lamps 122 are brake lamps, and/or shifted into reverse.

The CHMSL lamps 122 are positioned inside the CHMSL housing 118. The CHMSL lamps 122 may be any lighting system suitable for easy visibility by other vehicles operating near the first vehicle 100, e.g., tungsten, halogen, high-intensity discharge (HID) such as xenon, light-emitting diode (LED), laser, etc.

The radar 106 is suitable for detecting objects 104, e.g., in or near the storage area 114. The radar 106 as is known uses radio waves to determine the relative location, angle, and/or velocity of an object 104 by tracking the time required for the radio waves generated by the radar 106 to reflect back to the radar 106. The radar 106 runs at a scanning rate, which is a frequency of generating and transmitting the radio waves, e.g., twice per second, four times per second, etc. The power draw, i.e., the rate of power consumption, of the radar 106 depends on the scanning rate, i.e., typically is higher for higher scanning rates.

The radar 106 can be arranged in the CHMSL housing 118 so that a field of view of the radar 106 encompasses the storage area 114 of the first vehicle 100 and a region behind the first vehicle 100 when the CHMSL housing 118 is installed. For example, the radar 106 can be bolted into a fixed position 134 relative to the CHMSL housing 118. The radar 106 can face rearward and downward.

The camera 120 is any optical sensor or camera suitable for providing detailed data about a surrounding area, e.g., the storage area 114 and objects 104 in or near the storage area 114 or behind the first vehicle 100. The camera 120 as is known detects electromagnetic radiation in some range of wavelengths. For example, the camera 120 may detect visible light, infrared radiation, ultraviolet light, or some range of wavelengths including visible, infrared, and/or ultraviolet light. The power draw of the camera 120 is higher than the power draw of the radar 106, for any scanning rate of the radar 106.

The camera 120 can be arranged in the CHMSL housing 118 so that a field of view of the camera 120 encompasses the storage area 114 and a region behind the first vehicle 100 when the CHMSL housing 118 is installed. For example, the camera 120 can be bolted into a fixed position 134 relative to the CHMSL housing 118. The camera 120 can face rearward and downward.

Figure 4:
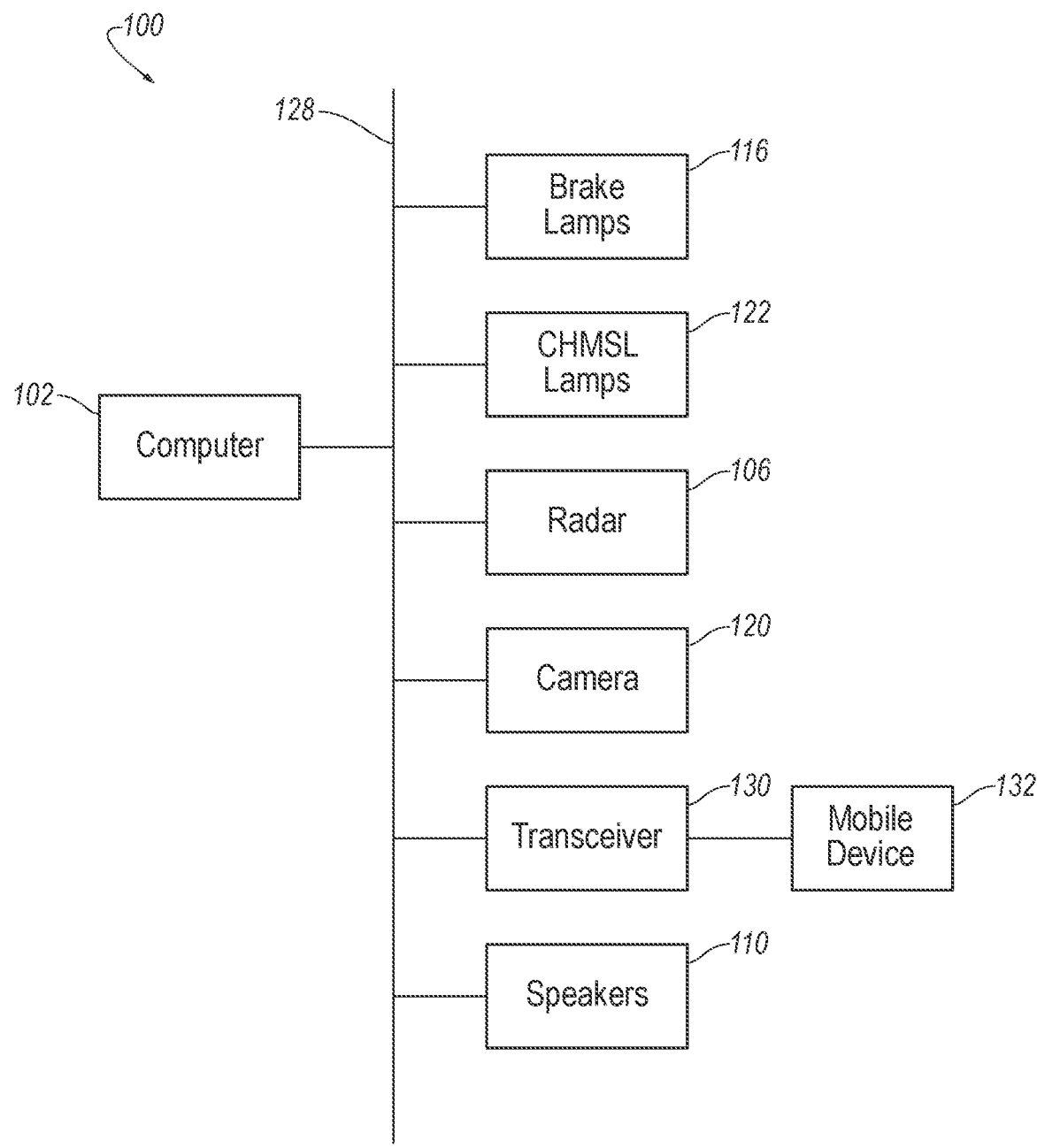
FIG. 4 is a block diagram of the vehicle.

With reference to FIG. 4, the computer 102 is a microprocessor-based computing device, e.g., a generic computing device including a processor and a memory, an electronic controller or the like, a field-programmable gate array (FPGA), an application-specific integrated circuit (ASIC), etc. The computer 102 can thus include a processor, a memory, etc. The memory of the computer 102 can include media for storing instructions executable by the processor as well as for electronically storing data and/or databases, and/or the computer 102 can include structures such as the foregoing by which programming is provided. The computer 102 can be multiple computers coupled together.

The computer 102 may transmit and receive data through a communications network 128 such as a controller area network (CAN) bus, Ethernet, WiFi, Local Interconnect Network (LIN), onboard diagnostics connector (OBD-II), and/or by any other wired or wireless communications network. The computer 102 may be communicatively coupled to the radar 106, the camera 120, the corner lamps 116, the CHMSL lamps 122, a transceiver 130, the speakers 11, and other components via the communications network 128.

The transceiver 130 may be adapted to transmit signals wirelessly through any suitable wireless communication protocol, such as Bluetooth®, WiFi, IEEE 802.11a/b/g, other RF (radio frequency) communications, etc. The transceiver 130 may be adapted to communicate with a remote server, that is, a server distinct and spaced from the vehicle. The remote server may be located outside the vehicle. For example, the remote server may be associated with another vehicle (e.g., V2V communications), an infrastructure component (e.g., V2I communications via Dedicated Short-Range Communications (DSRC) or the like), an emergency responder, a mobile device 132 associated with the owner of the vehicle, etc. The transceiver 130 may be one device or may include a separate transmitter and receiver.

The mobile device 132 is a portable computing device such as a mobile phone, e.g., a smartphone, or a tablet. The mobile device 132 is a computing device including a processor and a memory. The mobile device 132 is owned and carried by a person who may be the operator or owner of the first vehicle 100.

The speakers 110 are positioned to project sound externally from the first vehicle 100. The speakers 110 are electroacoustic transducers that convert an electrical signal into sound. The speakers 110 can be any suitable type for producing sound audible to individuals in the vicinity of the first vehicle 100, e.g., dynamic. The speakers 110 can include a horn of the first vehicle 100.

Figure 5:
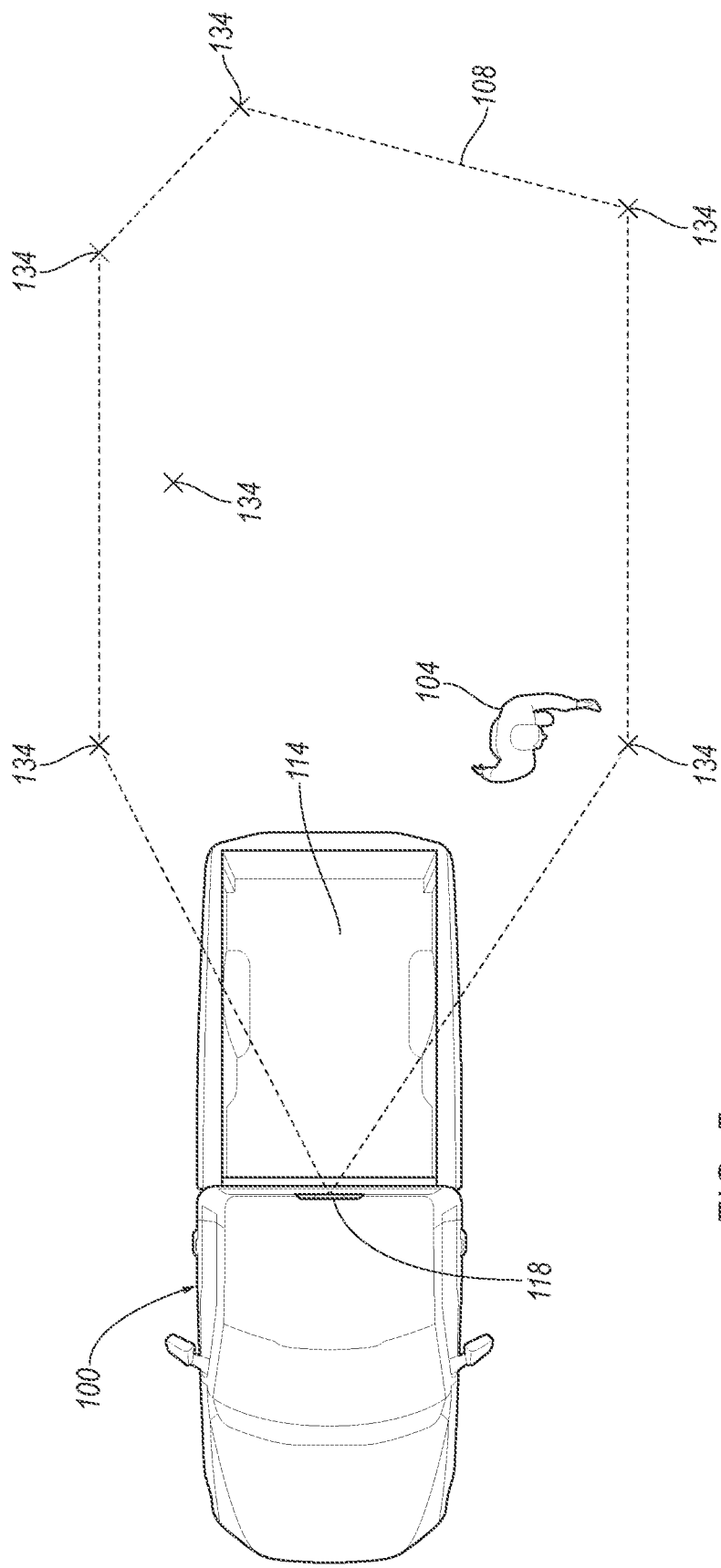
FIG. 5 is a diagram of a first example of a predesignated area.
Figure 6:
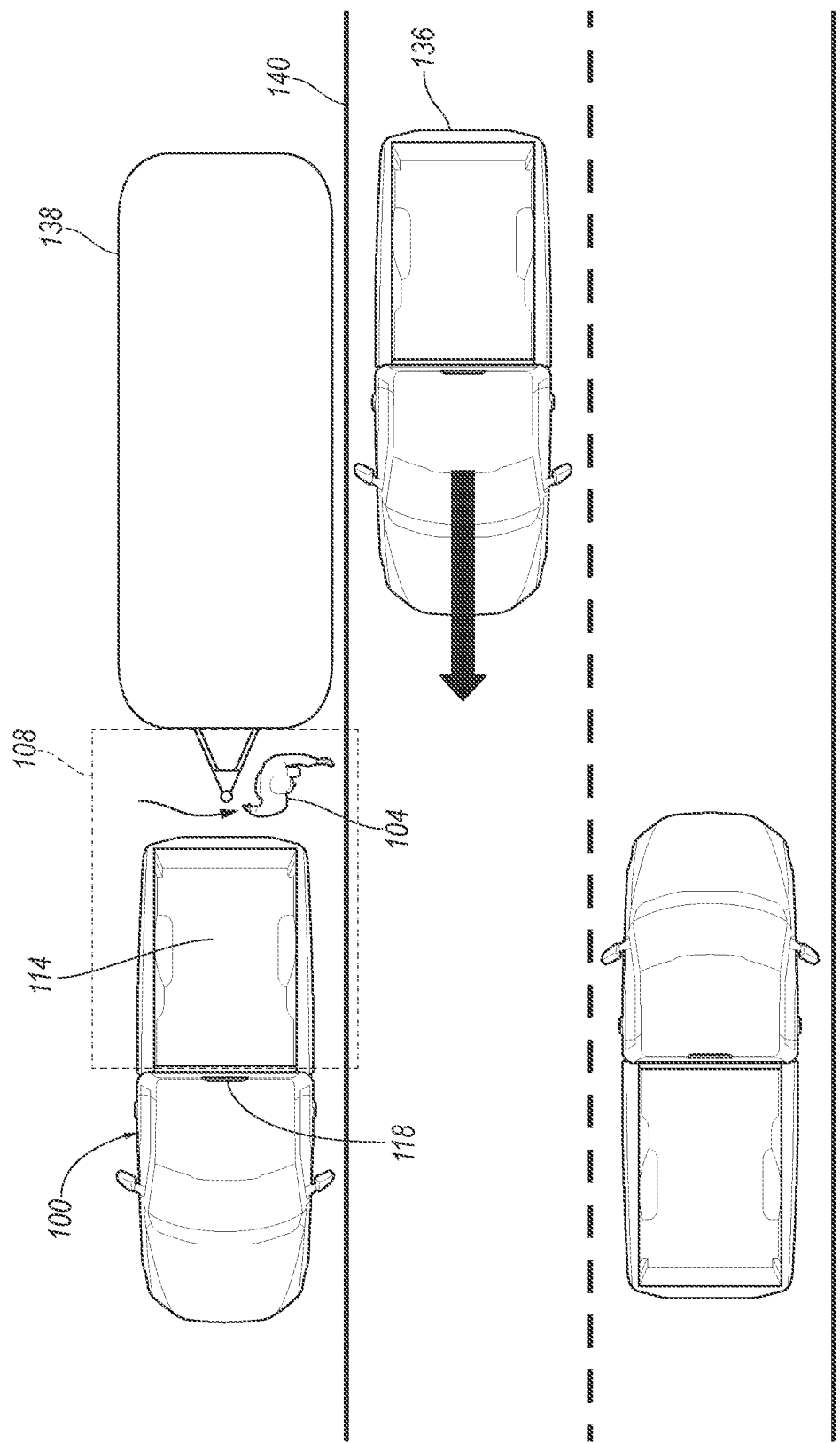
FIG. 6 is a diagram of a second example of a predesignated area.

With reference to FIGS. 5 and 6, the computer 102 monitors data from the radar 106 and the camera 120 for certain behavior in the predesignated region 108, as described below with respect to a process 700. The predesignated region 108 is a bounded area located behind the first vehicle 100. The predesignated region 108 can also encompass part of the first vehicle 100, e.g., the storage area 114.

As shown in FIG. 5, the predesignated region 108 can be generated based on input from a user, as described in more detail below with respect to blocks 704-708. The input can be a plurality of positions 134, represented as respective coordinates. The coordinates can be in an absolute coordinate system, e.g., based on GPS, or the coordinates can be in a coordinate system measured relative to the first vehicle 100. The predesignated region 108 can be circumscribed by the positions 134, i.e., can be a shape with edges connecting the positions 134, with the location of the CHMSL housing 118 as one of the positions 134 in addition to the positions 134 provided by the inputs. For example, the predesignated region 108 can be a shape formed by connecting each position 134 in the order that the positions 134 were received as input, even if the shape is concave. Alternatively, the predesignated region 108 can be the smallest convex shape encompassing all the points, as shown in FIG. 5. A shape is called convex if, for any two points in the shape, the straight-line segment joining them lies entirely within the shape, and concave otherwise.

As shown in FIG. 6, the predesignated region 108 can be generated based on detecting a trailer 138, as described in more detail below with respect to blocks 712 and 716 of the process 700. The predesignated region 108 can be a region between the first vehicle 100 and the trailer 138. The predesignated region 108 can extend longitudinally relative to the first vehicle 100 from a point on the first vehicle 100, e.g., the CHMSL housing 118, to the trailer 138, and the predesignated region 108 can extend laterally relative to the vehicle in both direction to a predefined distance beyond either the first vehicle 100 or the trailer 138, whichever is farther. In FIG. 6, the first vehicle 100 and the trailer 138 are shown parked on a shoulder of a roadway 140 with an approaching second vehicle 136, but the first vehicle 100 and the trailer 138 could be parked in any environment.

Figure 7A:
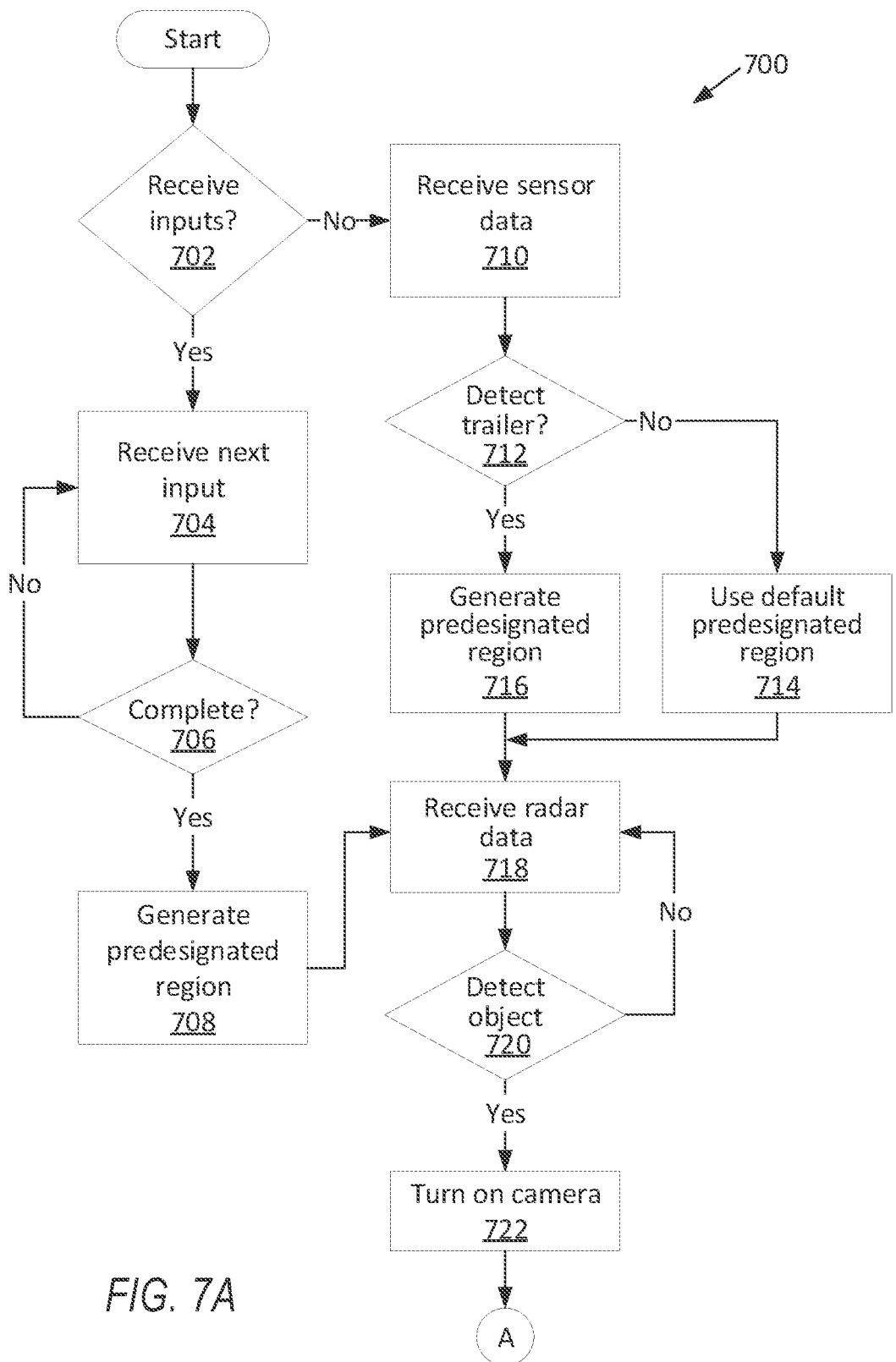
FIGS. 7A and 7B are together a process flow diagram of an example process for activating an alarm for an object in a predesignated area.
Figure 7B:
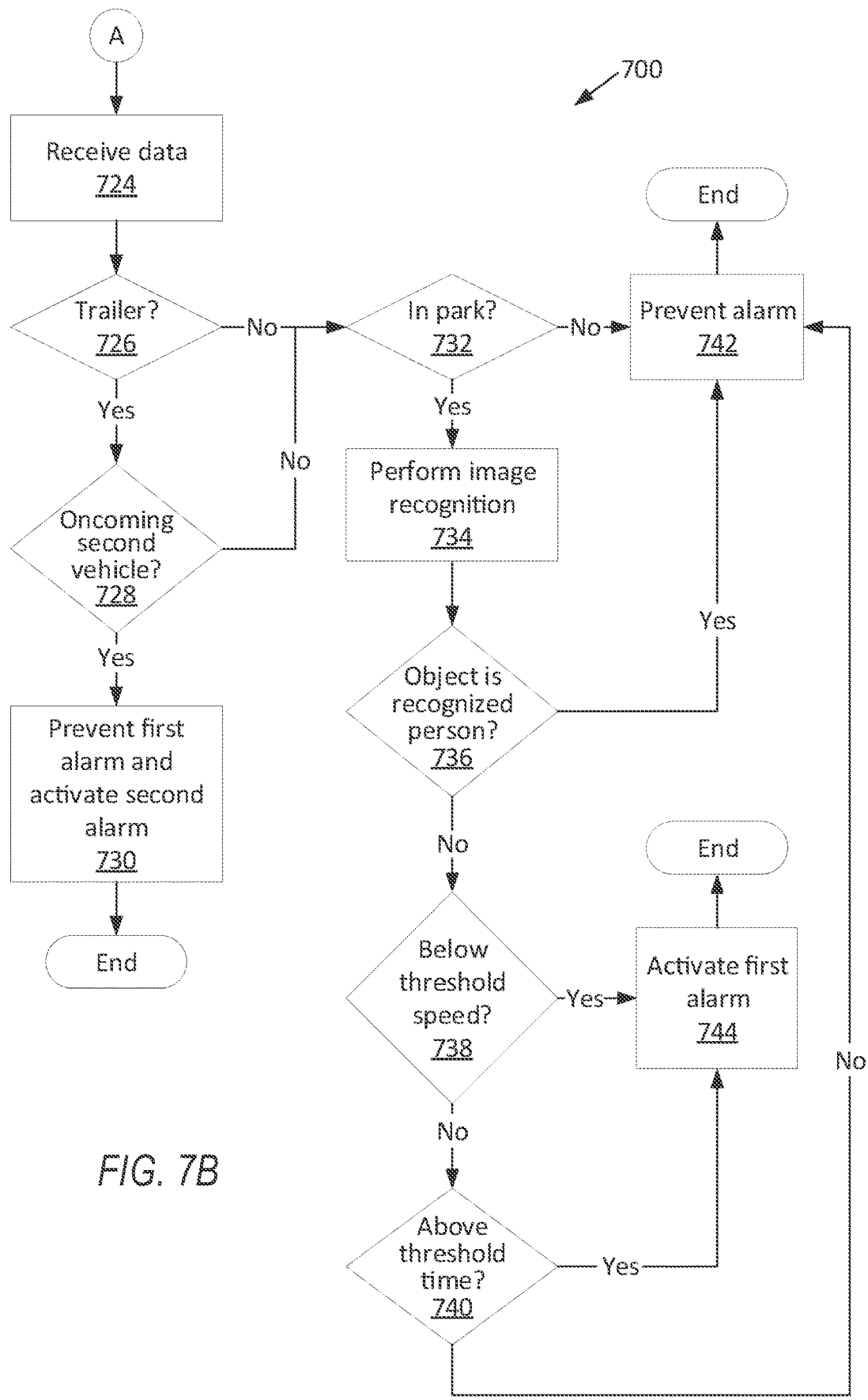

FIGS. 7A and 7B together are a process flow diagram illustrating an exemplary process 700 for activating an alarm for an object 104 in a predesignated area under certain conditions. The memory of the computer 102 stores executable instructions for performing the steps of the process 700 and/or programming can be implemented in structures such as mentioned above.

As a general overview of the process 700, the computer 102 generates the predesignated region 108 based on receiving a plurality of inputs in sequence if the user selects to use the inputs. If the user does not select to use the inputs, the computer 102 receives sensor data and, if a trailer 138 is detected, generates the predesignated region 108 between the first vehicle 100 and the trailer 138. If no trailer 138 is detected, the computer 102 uses a default predesignated region 108, e.g., the storage area 114. The computer 102 receives radar data and, if an object 104 is detected, turns on the camera 120. In response to detecting a second vehicle 136 that is rearward from the trailer 138 relative to the first vehicle 100 and that is moving forward relative to the first vehicle 100, the computer 102 prevents a first alarm and activates a second alarm. The first alarm can be the speakers 110 or can be both the speakers 110 and the brake lamps 116, 122, and the second alarm can be the brake lamps 116, 122 alone. Otherwise, if the first vehicle 100 is not in park, the computer 102 prevents any alarm from activating. If the first vehicle 100 is in park, the computer 102 performs image recognition and, if the object 104 is a recognized person, prevents any alarm from activating. Otherwise, the computer 102 activates the first alarm in response to the object 104 moving through a predesignated region 108 behind the first vehicle 100 at a speed below a threshold speed or for a duration above a threshold time.

The process 700 begins in a decision block 702, in which the computer 102 determines whether the user has selected to generate the predesignated region 108 by using the inputs, e.g., via an application on the mobile device 132 that is in communication with the computer 102 via the transceiver 130. For example, the user can select to use the inputs by starting the application for providing the plurality of inputs of the positions 134. If the user has selected to generate the predesignated region 108 with the inputs, the process 700 proceeds to a block 704. If the user has selected not to generate the predesignated region 108 with the inputs or has not made any selection, the process 700 proceeds to a block 710.

In the block 704, the computer 102 receives a next input from the mobile device 132. The respective inputs are the respective positions 134 for generating the predesignated region 108 as shown in FIG. 5. For example, the user can create the input by standing with the mobile device 132 at the position 134 desired for the input and selecting an option in the application to create the next input. The input can thus include the position 134 of the mobile device 132 at the time of creating the input. The mobile device 132 can use built-in GPS functionality to determine the position 134 of the mobile device 132 and then send that position 134 as the input.

Next, in a decision block 706, the computer 102 determines whether the user has selected an option in the application indicating that all the inputs have been sent to the computer 102. If not, the process 700 returns to the block 704 to receive the next input. If so, the process 700 proceeds to a block 708.

In the block 708, the computer 102 generates the predesignated region 108 based on the inputs. As described above and shown in FIG. 5, the predesignated region 108 can be generated as a shape circumscribed by the positions 134, i.e., with edges connecting the positions 134 into the shape. After the block 708, the process 700 proceeds to a block 718.

In the block 710, i.e., if the user has not selected to generate the predesignated region 108 with the inputs, the computer 102 receives data from the radar 106 and/or the camera 120, e.g., radar data from the radar 106 and image data from the camera 120.

Next, in a decision block 712, the computer 102 detects whether the trailer 138 is behind the first vehicle 100. For example, the trailer 138 can be equipped with a Bluetooth® Low Energy (BLE) transmitter, and detecting the trailer 138 can mean receiving a message from the trailer 138 via BLE. Because BLE has a short range, the BLE message indicates that the trailer 138 is nearby. For another example, the computer 102 can perform image recognition techniques on image data received from the camera 120 to recognize the trailer 138 in the image data. The computer 102 can identify the trailer 138 using conventional image-recognition techniques, e.g., a convolutional neural network programmed to accept images as input and output an identified object. A convolutional neural network includes a series of layers, with each layer using the previous layer as input. Each layer contains a plurality of neurons that receive as input data generated by a subset of the neurons of the previous layers and generate output that is sent to neurons in the next layer. Types of layers include convolutional layers, which compute a dot product of a weight and a small region of input data; pool layers, which perform a downsampling operation along spatial dimensions; and fully connected layers, which generate based on the output of all neurons of the previous layer. The final layer of the convolutional neural network generates a score for each potential object, and the final output is the object such as "trailer" with the highest score. If the computer 102 does not detect the trailer 138 behind the first vehicle 100, the process 700 proceeds to a block 714. If the computer 102 detects the trailer 138 behind the first vehicle 100, the process 700 proceeds to a block 716.

In the block 714, the computer 102 uses a default predesignated region 108. The default predesignated region 108 is stored in memory. For example, the default predesignated region 108 can be just the storage area 114. For another example, the default predesignated region 108 can be the storage area 114 along with up to a predefined distance directly behind the vehicle 100. The predefined distance can be chosen to encompass an area in which a person standing would be in reach of the storage area 114. After the block 714, the process 700 proceeds to a block 718.

In the block 716, the computer 102 generates the predesignated region 108 between the first vehicle 100 and the trailer 138. As described above and shown in FIG. 6, the predesignated region 108 can extend longitudinally relative to the first vehicle 100 from a point on the first vehicle 100, e.g., the CHMSL housing 118, to the trailer 138, and the predesignated region 108 can extend laterally relative to the vehicle in both direction to a predefined distance beyond either the first vehicle 100 or the trailer 138, whichever is farther. The predefined distance can be chosen to provide sufficient time to activate the camera 120 (as described below with respect to a block 722) in response to detecting an object 104 before the object 104 is in reach of the first vehicle 100, if the object 104 is a person.

Next, in the block 718, the computer 102 receives radar data from the radar 106. After the predesignated region 108 was generated in the block 708 or the block 716, the user may have chosen to turn off the first vehicle 100. When the first vehicle 100 is off, the camera 120 may be deactivated to save power while leaving the radar 106 activated because the radar 106 has a lower power draw than the camera 120.

Next, in a decision block 720, the computer 102 determines whether an object 104 has been detected in the radar data, specifically a newly present object 104 in the predesignated region 108. For example, the computer 102 can determine from the radar data received from the radar 106 that radio waves in some direction indicate a shorter distance to the object 104 than before. If the computer 102 has not detected an object 104, the process 700 returns to the block 718 to continue monitoring the radar data. If the computer 102 has detected an object 104, the process 700 proceeds to a block 722.

In the block 722, the computer 102 turns on the camera 120 if the camera 120 is off. For example, the camera 120 may have been turned off based on the first vehicle 100 being turned off.

Next, in a block 724, the computer 102 receives data from the radar 106 and/or the camera 120, e.g., radar data from the radar 106 and image data from the camera 120.

Next, in a decision block 726, the computer 102 determines whether the predesignated region 108 was generated based on the trailer 138, i.e., whether the block 716 was performed rather than the block 708 or the block 714. If the predesignated region 108 is based on the inputs from the user, the process 700 proceeds to a decision block 732. If the predesignated region 108 is based on the presence of the trailer 138, the process 700 proceeds to a decision block 728.

In the decision block 728, the computer 102 determines whether the object 104 is present in the predesignated region 108 while the second vehicle 136 is rearward from the trailer 138 relative to the first vehicle 100 and moving forward relative to the first vehicle 100. This situation is depicted in FIG. 6. As shown, if the object 104 is a person, the person's line of sight to the second vehicle 136 may be blocked by the trailer 138. The computer 102 may use the radar data and/or the image data to make the determination. The radar data may indicate that a distance to an object 104 in a region rearward from the trailer 138 is decreasing. The image data may be subject to image recognition techniques such as described above. If there is not a second vehicle 136 that is rearward from the trailer 138 and moving forward, the process 700 proceeds to the decision block 732. In response to detecting the second vehicle 136 that is rearward from the trailer 138 and moving forward, the process 700 proceeds to a block 730.

In the block 730, the computer 102 prevents the first alarm from activating and activates the second alarm. The first alarm can be the speakers 110 or can be both the speakers 110 and the brake lamps 116, 122, and the second alarm can be the brake lamps 116, 122 alone. Activating the second alarm can be illuminating the brake lamps 116, 122. Because the first alarm uses the speakers 110 and the second alarm doesn't, the second alarm has a lower likelihood of provoking a startle response from the person than the first alarm, while still providing a warning to the person. After the block 730, the process 700 ends.

In the decision block 732, the computer 102 determines whether the first vehicle 100 is in park or is in a gear other than park, e.g., first, second, reverse, neutral, etc. The gear of the first vehicle 100 can be broadcast by a control module over the communications network 128. If the first vehicle 100 is in park, the process 700 proceeds to a block 734. In response to the first vehicle 100 being in a gear other than park, the process 700 proceeds to a block 742.

In the block 734, the computer 102 can recognize a person, e.g., a face of the person, as the object 104 using conventional image-recognition techniques. Image data of the faces of certain people can be stored in the memory of the computer 102, e.g., owners or regular operators of the first vehicle 100. For example, the computer 102 can use a convolutional neural network programmed to accept the image data from the camera 120 as input and output an identified object 104, e.g., a person or a particular face. A convolutional neural network includes a series of layers, with each layer using the previous layer as input. Each layer contains a plurality of neurons that receive as input data generated by a subset of the neurons of the previous layers and generate output that is sent to neurons in the next layer. Types of layers include convolutional layers, which compute a dot product of a weight and a small region of input data; pool layers, which perform a downsampling operation along spatial dimensions; and fully connected layers, which generate based on the output of all neurons of the previous layer.

The final layer of the convolutional neural network generates a score for each potential object 104, and the final output is the object 104 with the highest score. The image recognition can be performed twice, first to recognize the object 104 as a person and second, if the object 104 is a person, to recognize a portion of the person as one of the faces stored in memory.

Next, in a block 736, the computer 102 determines whether the object 104 is a recognized person. For example, the computer 102 can determine whether the highest score from the second image recognition of the block 734 is one of the faces stored in memory. For another example, the computer 102 can determine that the object 104 is a recognized person based on receiving a message from the mobile device 132 or from a key fob of the person. The message can establish a communications channel between the mobile device 132 and the computer 102, i.e., pairing or synchronizing. The message can be a signal from the key fob, which indicates that the key fob is within a certain range of the transceiver 130. The identity of the mobile device 132 or key fob can be stored in memory, and the fact that the mobile device 132 or key fob matches one stored in memory indicates that the object 104 is a recognized person. In response to recognizing the person, the process 700 proceeds to a block 742. If the object 104 is not a recognized person, i.e., the object 104 is an unrecognized person or a nonperson, the process 700 proceeds to a decision block 738.

In the decision block 738, the computer 102 determines whether the object 104 moved through the predesignated region 108 at a speed below a threshold speed. The threshold speed can be chosen to distinguish walking quickly past the storage area 114 of the first vehicle 100 from walking slowly by the storage area 114 of the vehicle. The computer 102 can determine the speed v of the object 104 by determining a first position 134 ($x_1$, $y_1$) of the object 104 at a first time $t_1$ and a second position 134 ($x_2$, $y_2$) of the object 104 at a second time $t_2$ using the radar data or the image data and then divide the distance between the positions 134 by the change in time:

$$v = \frac{\sqrt{(x_2 - x_1)^2 + (y_2 - y_1)^2}}{t_2 - t_1}$$

In response to the object 104 moving through the predesignated region 108 at a speed v below the threshold speed, the process 700 proceeds to a block 744. If the object 104 moves through the predesignated region 108 at a speed above the threshold speed, the process 700 proceeds to a decision block 740.

In the decision block 740, the computer 102 determines whether the object 104 moved through the predesignated region 108 for a duration above a threshold time. The threshold time can be chosen to separate walking quickly past the storage area 114 of the first vehicle 100 from lingering near the storage area 114. Using the radar data or the image data, the computer 102 can determine an initial time to at which the object 104 entered the predesignated region 108 and then determine whether the object 104 is still in the predesignated region 108 once the threshold time T has elapsed, i.e., at a time $t_0$+T. In response to the object 104 moving through the predesignated region 108 for a duration above the threshold time, the process 700 proceeds to the block 744. If the object 104 moves out of the predesignated region 108 within the threshold time, the process 700 proceeds to the block 742.

In the block 742, the computer 102 prevents the first alarm and second alarm from activating, i.e., prevents the speakers 110 from sounding and the brake lamps 116, 122 from illuminating. The block 742 is performed if either the first vehicle 100 is not in park or the object 104 is a recognized person. If the first vehicle 100 is in gear, then the first vehicle 100 has an operator that can notice if someone is near the storage area 114, and activating an alarm may distract the operator. If the object 104 is a recognized person, then there is not a need to warn away that person, and doing so may cause annoyance. After the block 742, the process 700 ends.

In the block 744, the computer 102 activates the first alarm, e.g., produces a sound with the speakers 110, as well as possibly illuminating the brake lamps 116, 122 such as by flashing. The first alarm can warn away a person from the storage area 114 of the first vehicle 100. After the block 744, the process 700 ends.

Computer executable instructions may be compiled or interpreted from computer programs created using a variety of programming languages and/or technologies, including, without limitation, and either alone or in combination, Java™, C, C++, Visual Basic, Java Script, Perl, HTML, etc. In general, a processor (e.g., a microprocessor) receives instructions, e.g., from a memory, a computer readable medium, etc., and executes these instructions, thereby performing one or more processes, including one or more of the processes described herein. Such instructions and other data may be stored and transmitted using a variety of computer readable media. A file in a networked device is generally a collection of data stored on a computer readable medium, such as a storage medium, a random access memory, etc. A computer readable medium includes any medium that participates in providing data (e.g., instructions), which may be read by a computer. Such a medium may take many forms, including, but not limited to, non volatile media, volatile media, etc. Non volatile media include, for example, optical or magnetic disks and other persistent memory. Volatile media include dynamic random access memory (DRAM), which typically constitutes a main memory. Common forms of computer readable media include, for example, a floppy disk, a flexible disk, hard disk, magnetic tape, any other magnetic medium, a CD ROM, DVD, any other optical medium, punch cards, paper tape, any other physical medium with patterns of holes, a RAM, a PROM, an EPROM, a FLASH EEPROM, any other memory chip or cartridge, or any other medium from which a computer can read.

The disclosure has been described in an illustrative manner, and it is to be understood that the terminology which has been used is intended to be in the nature of words of description rather than of limitation. Use of "in response to" and "upon determining" indicates a causal relationship, not merely a temporal relationship. The adjectives "first" and "second" are used throughout this document as identifiers and are not intended to signify importance, order, or quantity. Many modifications and variations of the present disclosure are possible in light of the above teachings, and the disclosure may be practiced otherwise than as specifically described.

The invention claimed is:

1. A computer comprising a processor and a memory storing instructions executable by the processor to:
   identify a trailer behind a first vehicle;

upon identifying the trailer, generate a predesignated region behind the first vehicle, wherein the predesignated region is a region between the first vehicle and the trailer;
detect an object in data received from a rear-facing radar on the first vehicle;
activate an alarm in response to the object moving through the predesignated region at a speed below a threshold speed or for a duration above a threshold time; and
prevent the alarm from activating in response to the object being present in the predesignated region while detecting a second vehicle that is rearward from the trailer relative to the first vehicle and that is moving forward relative to the first vehicle.

2. The computer of claim 1, wherein the instructions include instructions to receive a plurality of inputs from a mobile device, and generate the predesignated region based on the inputs.

3. The computer of claim 2, wherein the inputs are positions of the mobile device, and the predesignated region is circumscribed by the positions.

4. The computer of claim 1, wherein the alarm is a first alarm, and the instructions include instructions to activate a second alarm in response to the object being present in the predesignated region while detecting the second vehicle that is rearward from the trailer relative to the first vehicle and that is moving forward relative to the first vehicle.

5. The computer of claim 4, wherein activating the second alarm is illuminating a brake lamp of the first vehicle.

6. The computer of claim 1, wherein identifying the trailer includes receiving a message from the trailer via Bluetooth Low Energy.

7. The computer of claim 1, wherein identifying the trailer includes receiving image data from a camera including the trailer and performing image recognition on the trailer.

8. The computer of claim 1, wherein the instructions include instructions to determine that the object is a person, recognize the person, and prevent the alarm from activating in response to recognizing the person.

9. The computer of claim 8, wherein recognizing the person includes receiving image data from a camera including a face of the person and performing image recognition on the face.

10. The computer of claim 8, wherein recognizing the person includes receiving a message from a mobile device or key fob of the person.

11. A system comprising:
a rear-facing radar on a first vehicle;
an alarm on the first vehicle; and
a computer communicatively coupled to the radar and the alarm;
wherein the computer is programmed to:
identify a trailer behind the first vehicle;
upon identifying the trailer, generate a predesignated region behind the first vehicle, wherein the predesignated region is a region between the first vehicle and the trailer;
detect an object in data received from the radar;
activate the alarm in response to the object moving through the predesignated region at a speed below a threshold speed or for a duration above a threshold time; and
prevent the alarm from activating in response to the object being present in the predesignated region while detecting a second vehicle that is rearward from the trailer relative to the first vehicle and that is moving forward relative to the first vehicle.

12. The system of claim 11, further comprising a center high-mounted stop lamp (CHMSL) housing containing the radar, wherein the radar is arranged in the CHMSL housing so that the field of view of the radar encompasses a storage area of the first vehicle when the CHMSL housing is installed.

13. The system of claim 12, further comprising a lamp contained in the CHMSL housing and communicatively coupled to the computer;
wherein
the computer is further programmed to:
activate the lamp in response to the object being present in the predesignated region while detecting the second vehicle that is rearward from the trailer relative to the first vehicle and that is moving forward relative to the first vehicle.

14. The system of claim 12, further comprising a camera contained in the CHMSL housing and communicatively coupled to the computer, wherein identifying the trailer includes using image recognition on data received from the camera.

15. The system of claim 12, further comprising a camera contained in the CHMSL housing and communicatively coupled to the computer, wherein the computer is further programmed to:
determine that the object is a person;
recognize the person by performing image recognition on a face of the person in data received from the camera; and
prevent the alarm from activating in response to recognizing the person.

16. The system of claim 12, further comprising a camera contained in the CHMSL housing and communicatively coupled to the computer, wherein the computer is further programmed to turn on the camera in response to the object moving through the predesignated region.

17. A method comprising:
identifying a trailer behind a first vehicle;
upon identifying the trailer, generating a predesignated region behind the first vehicle, wherein the predesignated region is a region between the first vehicle and the trailer;
detecting an object in data received from a rear-facing radar on the first vehicle;
activating an alarm in response to the object moving through the predesignated region behind the first vehicle at a speed below a threshold speed or for a duration above a threshold time; and
preventing the alarm from activating in response to the object being present in the predesignated region while detecting a second vehicle that is rearward from the trailer relative to the first vehicle and that is moving forward relative to the first vehicle.

18. A computer comprising a processor and a memory storing instructions executable by the processor to:
detect an object in data received from a rear-facing radar on a vehicle;
activate an alarm in response to the object moving through a predesignated region behind the vehicle at a speed below a threshold speed or for a duration above a threshold time;
receive a plurality of inputs from a mobile device; and
generate the predesignated region based on the inputs;
wherein the inputs are positions of the mobile device; and the predesignated region is circumscribed by the positions.

19. A computer comprising a processor and a memory storing instructions executable by the processor to:
- detect an object in data received from a rear-facing radar on a vehicle;
- activate an alarm in response to the object moving through a predesignated region behind the vehicle at a speed below a threshold speed or for a duration above a threshold time;
- determine that the object is a person;
- recognize the person; and
- prevent the alarm from activating in response to recognizing the person.

* * * * *